(12) United States Patent
Aronsson et al.

(10) Patent No.: US 8,099,455 B2
(45) Date of Patent: Jan. 17, 2012

(54) NOTIFYING REMOTE DEVICES OF AVAILABLE CONTENT

(75) Inventors: Par-Anders Aronsson, Klagshamn (SE); Andreas Kristensson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 349 days.

(21) Appl. No.: 11/839,878

(22) Filed: Aug. 16, 2007

(65) Prior Publication Data
US 2009/0049156 A1  Feb. 19, 2009

(51) Int. Cl.
*G06F 15/16* (2006.01)
*G06F 3/00* (2006.01)

(52) U.S. Cl. ............ 709/203; 709/219; 725/41

(58) Field of Classification Search ........... 709/201, 709/203, 217–219, 246–247, 223–226, 227–228; 725/41, 112; 704/278; 715/738
See application file for complete search history.

(56) References Cited

U.S. PATENT DOCUMENTS

| | | | | |
|---|---|---|---|---|
| 5,963,964 A * | 10/1999 | Nielsen | ............... | 715/255 |
| 6,356,921 B1 * | 3/2002 | Kumar et al. | ............. | 715/203 |
| 6,934,740 B1 * | 8/2005 | Lawande et al. | ........... | 709/219 |
| 7,149,982 B1 * | 12/2006 | Duperrouzel et al. | ...... | 715/788 |
| 7,194,701 B2 * | 3/2007 | Stavely et al. | ............. | 715/838 |
| 7,302,118 B2 * | 11/2007 | Liu et al. | ................ | 382/306 |
| 2002/0026500 A1 * | 2/2002 | Kanefsky et al. | .......... | 709/219 |
| 2002/0095517 A1 * | 7/2002 | Sasaki et al. | .............. | 709/246 |
| 2002/0152876 A1 * | 10/2002 | Hughes et al. | .............. | 84/609 |
| 2002/0156691 A1 * | 10/2002 | Hughes et al. | .............. | 705/26 |
| 2003/0097361 A1 * | 5/2003 | Huang et al. | ............... | 707/10 |
| 2004/0162910 A1 * | 8/2004 | Kryeziu | .................... | 709/231 |
| 2005/0071375 A1 * | 3/2005 | Houghton et al. | ......... | 707/104.1 |
| 2005/0193067 A1 * | 9/2005 | Ferguson | ................ | 709/206 |
| 2006/0090124 A1 | 4/2006 | Kopra et al. | | |
| 2008/0010368 A1 * | 1/2008 | Hubbard et al. | ........... | 709/223 |
| 2008/0059906 A1 * | 3/2008 | Toki | ........................ | 715/810 |
| 2008/0086456 A1 * | 4/2008 | Rasanen et al. | ............ | 707/3 |
| 2009/0077220 A1 * | 3/2009 | Svendsen et al. | ........... | 709/224 |

FOREIGN PATENT DOCUMENTS

| | | |
|---|---|---|
| EP | 1 536 352 A1 | 6/2005 |
| GB | 2 409 786 A | 7/2005 |

OTHER PUBLICATIONS

International Search Report and Written Opinion (10 pages) corresponding to International Application No. PCT/EP2007/063295; Mailing Date: Sep. 19, 2008.

* cited by examiner

*Primary Examiner* — Brendan Higa
(74) *Attorney, Agent, or Firm* — Myers Bigel Sibley & Sajovec

(57) ABSTRACT

Methods of operating a portable electronic device including a display screen, a user interface, a controller, a memory and a transceiver are provided. The methods include executing a resource on the controller, and receiving a snapshot command through the user interface. In response to the snapshot command, a network address of a remote server from which the resource was downloaded is obtained, an audiovisual signal representative of the resource is generated, and the audiovisual signal and the network address are stored in a file. The file can be forwarded using the transceiver to a remote terminal, which can access the resource from the network address.

13 Claims, 4 Drawing Sheets

NOTIFYING REMOTE DEVICES OF AVAILABLE CONTENT

BACKGROUND

1. Field of the Invention

The present invention relates to portable electronic devices. In particular, the present invention relates to methods of promoting the distribution of content to portable electronic devices.

2. Description of the Related Art

Portable electronic devices, such as mobile telephones, are primarily used for obtaining access to wireless telephone services through a cellular telephone network. However, as the capabilities of mobile telephones increase, an additional level of user functionality is being included in the hardware and/or software of such terminals. For example, application software can be installed on mobile telephones, permitting them to perform a wide variety of functions. Many mobile telephones include applications suitable for tracking and managing schedules, tasks and the like. In addition, many mobile telephones also include messaging capability, such as electronic mail (e-mail), short message service (SMS) and multimedia message service (MMS) capabilities. Mobile telephones may also be capable of connecting to the Internet by using internet protocol (IP) over wireless and/or wired networks. Accordingly, some mobile telephones also include Internet browser software that is configured to access and display Internet content.

In general, many portable electronic devices, such as mobile telephones, personal digital assistants (PDAs), palm-top computers, and the like, have the ability to access a wide range of information content and downloadable application software over data communication networks such as the Internet.

In addition to accessing information content and application software, portable electronic devices are widely used to store and play back digital audio files, video files, image files, and/or other types of multimedia files. Multimedia files may include any other type of file containing audio, visual and/or textual information. For example, as used herein, a "multimedia" file may include files, such as audio, image and/or video files, as well as MMS or PPT message files.

Users of portable electronic devices often wish to share downloaded content and applications with friends, or to notify friends of the availability of certain content or applications for download. However, as downloading of applications and content can now occur more frequently and easily, it may be difficult to keep track of where a particular application or item of content was obtained from. Furthermore, it may not be desirable to transmit the content or application itself from one user's mobile phone to another user's mobile phone, due to the time and/or expense involved with transmitting large files. Thus, it may be difficult to quickly and easily promote the distribution of content among users of portable electronic devices, such as mobile telephones.

SUMMARY

Some embodiments of the invention provide methods of operating a portable electronic device including a display screen, a user interface, a controller, a memory and a transceiver. The methods include executing a resource on the controller, and receiving a snapshot command through the user interface. In response to the snapshot command, a network address of a remote server from which the resource was downloaded is determined, an audiovisual signal representative of the resource is generated, and the audiovisual signal and the network address are stored in a file.

Determining the network address of the remote server may include determining a uniform resource indicator (URI) associated with the remote server. In some embodiments, determining the network address may include retrieving the URI associated with the remote server from a table of URI entries associated with resources stored in the portable electronic device.

Storing the audiovisual signal with the network address may include generating Exif metadata including the network address and associating the Exif metadata with the audiovisual signal in the file.

The methods may further include receiving a forward command through the user interface, and in response to the forward command, transmitting the file to a remote terminal using the transceiver.

The methods may further include downloading the application program from the remote server using the transceiver, storing the network address of the remote server, and associating the network address of the remote server with the resource.

The methods may further include generating a database including associations of resources stored on the electronic device with network addresses of remote servers from which the respective resources were downloaded.

The resource may include an application program, and executing the resource on the controller may include executing the application program on the controller. Generating the audiovisual signal representative of the resource may include storing a copy of an audiovisual content generated by the application program.

The audiovisual content generated by the application program may include a display image generated by the application program, and/or an audio signal generated by the application program. The display image generated by the application program may include a still image and/or a video image.

The resource may include an audiovisual file, and generating an audiovisual signal representative of the resource may include generating a truncated and/or reduced version of the resource.

Generating the audiovisual signal representative of the resource may include saving a screenshot of an image on the display screen.

The methods may further include determining an identity of an active resource in response to the snapshot command.

A portable electronic device according to some embodiments of the invention includes a display screen configured to display still and/or video images, a user interface configured to receive a user input, a transceiver configured to establish a wireless communications link with a remote server and to download a resource from the remote server, and a controller configured to execute the resource. The controller is further configured to receive a snapshot command through the user interface during execution of the resource, and in response to the snapshot command, to determine a network address of the remote server and to store a snapshot of the resource and the network address in a file.

The controller is configured to determine the network address by retrieving a uniform resource indicator (URI) from a table of URI entries associated with resources stored in the portable electronic device.

The snapshot of the resource may include an image displayed on the display screen, and the controller may be configured to generate metadata including the network address and to include the metadata along with the snapshot in the file.

The controller may be further configured to receive a forward command through the user interface, and in response to the forward command, to transmit the file including the snapshot and the network address to a remote terminal using the transceiver.

The controller may be further configured to store the network address of the remote server in a database, and to associate the network address with the resource in the database.

A system according to some embodiments of the invention includes a provisioning server that stores a resource and that makes the resource available for downloading by remote terminals, and a portable electronic device. The portable electronic device includes a display screen configured to display still and/or video images, a user interface configured to receive a user input, a transceiver configured to establish a wireless communications link with the provisioning server and to download the resource from the provisioning server, and a controller configured to execute the resource, to receive a snapshot command through the user interface during execution of the resource, and in response to the snapshot command, to determine a network address associated with the provisioning server and to store a snapshot of the resource and the network address of the provisioning server in a file.

The controller of the portable electronic device may be further configured to receive a forward command through the user interface, and in response to the forward command, to transmit the file including the snapshot and the network address to a remote terminal using the transceiver.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
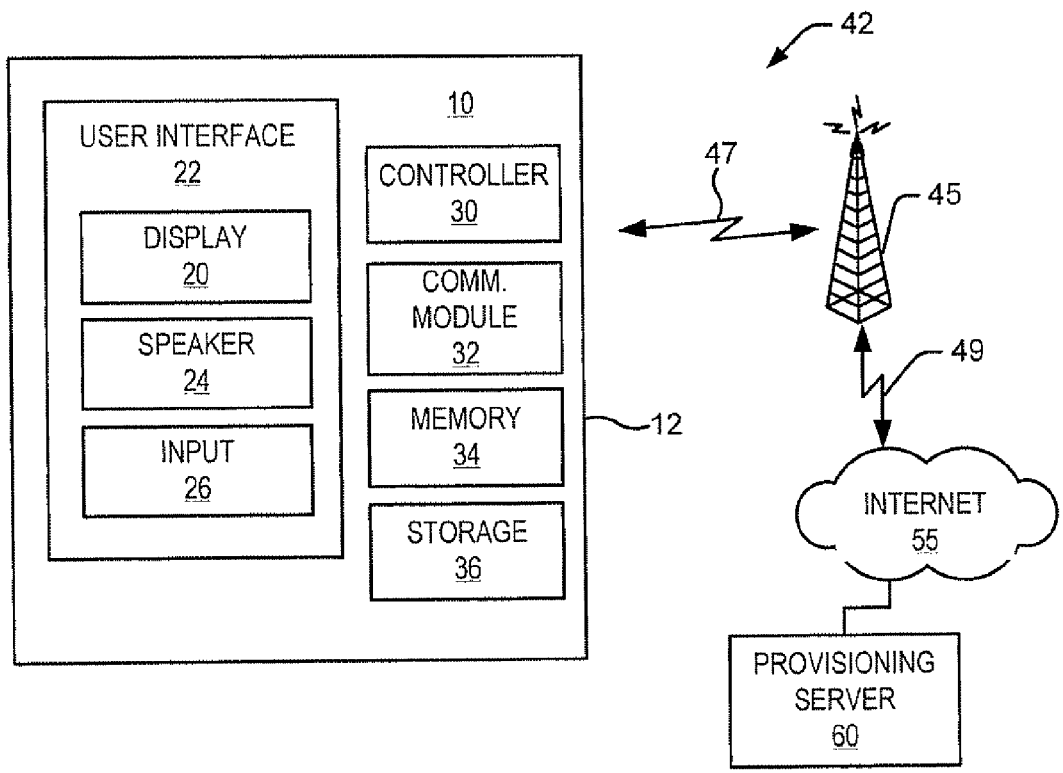
FIG. 1 is a schematic diagram of an electronic device, such as a portable electronic device, according to some embodiments of the present invention and an exemplary base transceiver station.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

The present invention may be embodied as methods, electronic devices, and/or computer program products. Accordingly, the present invention may be embodied in hardware (e.g. a controller circuit or instruction execution system) and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can electronically/magnetically/optically retain the program for use by or in connection with the instruction execution system, apparatus, controller or device.

Embodiments according to the present invention are described with reference to block diagrams and/or operational illustrations of methods and communication terminals. In this regard, each block may represent a module, segment, or portion of code, which comprises one or more executable instructions for implementing the specified logical function (s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, or semiconductor system, apparatus, or device. More specific examples (a nonexhaustive list) of the computer-readable medium include the following hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM).

As used herein, a "portable electronic device" includes, but is not limited to, a cellular telephone, personal data assistant (PDA), pager, and/or a computer that is configured to communicate data over a wireless communication interface that can include a cellular telephone interface, a satellite interface, a Bluetooth interface, a wireless local area network interface (e.g., 802.11), another RF communication interface, and/or an optical/infra-red communication interface. A portable electronic device can also include a terminal that is configured to receive/transmit communication signals via a wireline connection, such as via a public-switched telephone network (PSTN), digital subscriber line (DSL), digital cable, or another data connection/network.

Portable electronic devices may be portable, transportable, installed in a vehicle (aeronautical, maritime, or land-based), or situated and/or configured to operate locally and/or in a distributed fashion at any other location(s) on earth and/or in space.

As used herein "play," "playback," and/or "execution" of a multimedia file is used in a general sense and may include playing an audio file over a speaker, displaying a digital image on a display screen, displaying a video file on a display screen and simultaneously playing an audio file associated with and/or embedded in the video file over a speaker, and/or displaying a web page and executing scripts associated with and/or embedded in the web page.

Referring to FIG. 1, an exemplary portable electronic device 10 in accordance with some embodiments of the present invention is illustrated. As illustrated in FIG. 1, the portable electronic device 10 can be a wireless communication terminal. It will be appreciated that although embodiments of the invention are illustrated in connection with a wireless communication terminal, the invention may include wired mobile and/or non-mobile communication terminals and other electronic devices and methods. The portable electronic device 10 is configured to communicate data with one or more remote terminals over a direct wireless communication interface therebetween, over another wireless communication interface through one or more cellular base stations, and/or over another wireless communication interface through a wireless local area network (WLAN) router.

The portable electronic device 10 may be a mobile radiotelephone forming a part of a radiotelephone communication system 2 as illustrated in FIG. 1. The system 2 includes the portable electronic device 10 and a base transceiver station 45, which is part of a wireless communications network. In some embodiments of the present invention, the base transceiver station 45 includes the radio transceiver(s) that define an individual cell in a cellular network and that communicate with the portable electronic device 10 (via a wireless interface 47) and other mobile terminals in the cell using a radio-link protocol. It will be understood that, in some embodiments of the present invention, many base transceiver stations may be connected through, for example, a mobile switching center and other devices to define the wireless communications network.

The base transceiver station 45 may be connected to a data communications network 15, such as the Internet, via a communication link 49. It will be appreciated that the communication link 49 may include elements of the wireless communications network and/or one or more gateways, routers, or other communication nodes.

The portable electronic device 10 in the illustrated embodiments includes a portable housing assembly 12, a controller circuit 30 ("controller"), a communication module 32, and a memory 34. The portable electronic device 10 further includes a user interface 22 (i.e., a man-machine interface) including a display 20, a speaker 24 (i.e., a sound transducer), and at least one input device 26. The input device 26 may include a keyboard, which may be a numerical keyboard including keys that correspond to a digit as well as to one or more characters, such as may be found in a conventional wireless telephone. In some embodiments, the input device 26 may include a full QWERTY keyboard that may be operated, for example, using thumbs. More than one input device 26 may be included.

The display 20 may be any suitable display screen assembly. For example, the display screen 20 may be a liquid crystal display (LCD) with or without auxiliary lighting (e.g., a lighting panel). In some cases the portable electronic device 10 may be capable of playing video content of a particular quality. For example, a portable electronic device 10 may be configured to display a video stream having a particular aspect ratio, such as 16:9 or 4:3. A number of standard video formats have been proposed for mobile terminals, including Quarter VGA (QVGA, 320×240 pixels), Common Intermediate Format (CIF, 360×288 pixels) and Quarter Common Intermediate Format (QCIF, 180×144 pixels). Moreover, some mobile terminals may have multiple display screens having different display capabilities. Thus, a portable electronic device 10 may be capable of displaying video in one or more different display formats.

The user interface 22 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 24 generates sound responsive to an input audio signal. The user interface 22 can also include a microphone coupled to an audio processor that is configured to generate an audio signal responsive to sound incident on the microphone.

The controller 30 may support various functions of the portable electronic device 10. The controller 30 can be any commercially available or custom microprocessor that is suitable for use in a portable electronic device. In operation, the controller 30 of the portable electronic device 10 may generate a display image on the display 20. In some embodiments, however, a separate signal processor and/or video chip (not shown) may be provided in the portable electronic device 10 and may be configured to generate a display image on the display 20.

The memory 34 is a general purpose digital memory that is configured to store digital information signals and data such as a digital multimedia files (e.g., digital audio, image and/or video files), as well as operating system and application program files. Configuration information can also be stored in the memory 34.

The communication module 32 is configured to communicate data over one or more wireless interfaces to another remote wireless terminal as discussed herein. The communication module 32 can include a cellular communication module, a direct point-to-point connection module, and/or a WLAN module.

With a cellular communication module, the portable electronic device 10 can communicate via the base transceiver station(s) 45 of the network 42 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the portable electronic device 10 can communicate via an ad-hoc network through a direct point-to-point interface.

With a WLAN module, the wireless terminal 10 can communicate through a WLAN using a communication protocol that may include, but is not limited to, 802.11a, 802.11b, 802.11e, 802.11g, and/or 802.11i.

The communication module 32 can include a transceiver typically having a transmitter circuit and a receiver circuit, which respectively transmit outgoing radio frequency signals (e.g., to the network 42, a router or directly to another terminal) and receive incoming radio frequency signals (e.g., from the network 42, a router or directly to another terminal), such as voice and data signals, via an antenna. The communication module 32 may include a short range transmitter and receiver, such as a Bluetooth transmitter and receiver. The antenna may be an embedded antenna, a retractable antenna or any antenna known to those having skill in the art without departing from the scope of the present invention. The radio frequency signals transmitted between the portable electronic device 10 and the network 42, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The portable electronic device 10 may also be configured to electrically communicate with another terminal via a wireline or cable for the transmission of digital communication signals therebetween. The portable electronic device 10 may include further components such as a camera device configured to generate a still image and/or video data stream based on incident light.

The portable electronic device 10 also includes a storage device 36, such as a magnetic and/or optical data storage drive that can be used to store program and/or data files.

As shown in FIG. 1, the portable electronic device 10 can communicate with external devices through the wireless communication interface 47 with the base transceiver station 45. In particular, the portable electronic device 10 can establish a TCP/IP communication session with a provisioning server 60 that is connected to the base transceiver station 45 through a data communications network 15, such as the Internet. Application programs and/or information content, such as multimedia files, can be downloaded to the portable electronic device 10 from the provisioning server 60.

Although FIG. 1 illustrates an exemplary hardware/software architecture that may be used in mobile terminals and/or other electronic devices for management and playback of multimedia files, it will be understood that the present invention is not limited to such a configuration but is intended to encompass any configuration capable of carrying out operations described herein. For example, although the memory 34 is illustrated as separate from the controller 30, the memory 34 or portions thereof may be considered as a part of the controller 30. More generally, while particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multi processor system in accordance with various embodiments of the present invention.

Figure 2:
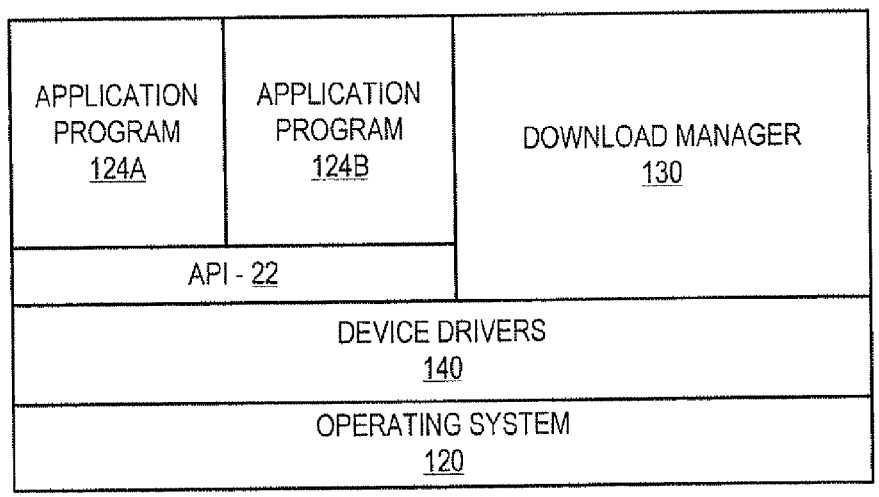
FIG. 2 illustrates a possible arrangement of software modules within the memory of a portable electronic device according to some embodiments of the invention.

FIG. 2 illustrates a software architecture including a possible arrangement of software modules within the memory 34 of the portable electronic device 10 according to some embodiments of the invention. Referring to FIG. 2, a software architecture of the portable electronic device 10 includes an operating system 120, which runs on the controller 30 and which is generally configured to control the operations of the portable electronic device 10, including the loading and running of application programs 124A, 124B, the operation of peripheral devices, such as the display 20 and the input device 26, and the management of peripheral chips, such as I/O chips, audio/video processing chips, signal processing chips, communication chips, and the like. A plurality of application programs 124A, 124B are loaded into the memory 34 and utilize services provided by the operating system 120 by invoking function calls to the operating system through an application programming interface (API) 122.

According to some embodiments of the invention, a download manager module 130 (or simply "download manager 130") is resident in the memory 34. The download manager 130 can be included as part of the operating system kernel and/or can operate as a separate application program that communicates directly with the operating system, as shown in FIG. 2. Alternatively or additionally, the download manager 130 can utilize services of the operating system using the application programming interface 122.

The download manager 130 monitors communications through device drivers 140, which may include, for example, communication device drivers, communication stacks (e.g. a TCP/IP stack), and other device drivers used for communications. The download manager 130 is configured to monitor the downloading and installation of resources, such as application programs and/or information content, by the portable electronic device 10. That is, the download manager 30 monitors external communications of the portable electronic device 10 and determines when the portable electronic device 10 has downloaded a resource, such as an executable application program or item of content, for example, using a data communications protocol, such as hypertext transport protocol (HTTP), file transfer protocol (FTP), or the like.

When the download manager 130 determines that an executable application program has been downloaded, the download manager 130 stores the network address, which may include a Uniform Resource Indicator (URI), from which the application program was downloaded. For example, in cases where the application program was downloaded from a provisioning server 60 using a TCP/IP connection, the download manager 130 may store a network address, such as a TCP/IP address and/or a World Wide Web domain address associated with the provisioning server 60. The download manager 130 then creates a record that associates the stored network address of the source of the application program with the application program executable file that was downloaded to the portable electronic device 10. The record is then stored in a database in the electronic memory 32 and/or in the storage device 36 of the device 10.

A Uniform Resource Identifier (URI), is a compact string of characters used to identify or name a resource (e.g., www-.sonyericsson.com). The main purpose of this identification is to enable interaction with remote elements over a network, typically the World Wide Web, using specific protocols. In some embodiments, the URI of the provisioning server 60 from which the application was downloaded could be combined with/added to the downloaded application package. The download manager 30 can then retrieve the URI from the application program package instead of from a separate database record.

In some embodiments, the download manager 30 may also be configured to monitor the execution of the downloaded executable program. If, upon execution of the downloaded executable program, another executable program is created or extracted, the download manager 30 can associate the extracted executable program with the network address already stored in memory for the downloaded executable program. For example, if the initially downloaded application program is a self-extracting compressed file that, upon execution, uncompresses and saves a second executable program (i.e., the extracted executable program), the download manager 30 can associate the extracted executable program with the network address from which the initial file was downloaded. In this manner, all executable programs can be associated with a network address from which they were downloaded can be associated with a network address associated with the source of the program.

The download manager 130 can also be configured to monitor the download of displayable/playable content, such as audio, video and/or image files. For example, the download manager can keep track of the network addresses of audio, video, image and/or other types of files that are downloaded onto the portable electronic device 10 to be played/displayed by application programs, such as media players. As is well known in the art, particular types of content can be associated with particular application programs, or media players, so that when an item of a particular type of content is selected, the associated media player can be automatically executed and provided with the selected item of content. The media player can then automatically play/display the item of content.

Upon downloading a particular item of content, the download manager 130 is configured to create a database record that associates the item of content with a network address of the server from which the item of content was obtained, Accordingly, the download manager 130 can create and maintain a database that identifies items of content, such as multimedia content, executable application programs and/or other resources that have been downloaded onto the portable electronic device 10, and that associates each such item of content/executable application program with a network address, such as a URI or TCP/IP internet address, from which the item of content/executable application program was obtained.

Figure 3:
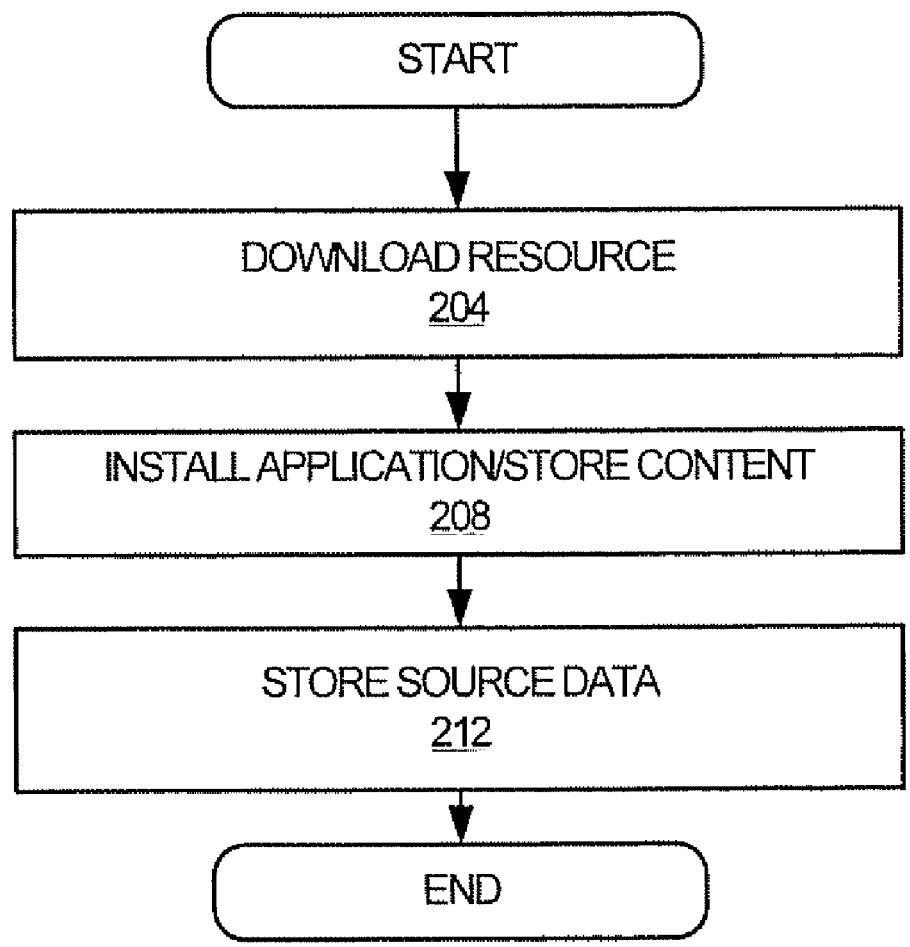
FIGS. 3, 4, and 5 are flowcharts illustrating operations in accordance with some embodiments of the present invention.

Accordingly, FIG. 3 illustrates some operations of a portable electronic device 10 according to some embodiments of the invention. As shown therein, the portable electronic device 10 can download a resource, such as an executable application program and/or item of content (Block 204). The resource can be downloaded, for example, in response to a user command from a user of the portable electronic device 10, and can be downloaded from a remote provisioning server 60, for example, over a TCP/IP connection established over the wireless communication link 47. As described above, the download manager 130 can monitor the download of the executable application program/item of content and save the network address of the provisioning server 60 from which the executable application program/item of content was downloaded (Block 208).

If an executable application program was downloaded, the application manager 130 can also monitor the installation of the application program on the portable electronic device 10 and associate any further executable applications that are installed by the downloaded application program (e.g. if the downloaded application program was an executable container application) with the network address from which the initial executable application was downloaded.

The download manager can then create and store a record in a database in the storage device 36 that associates the downloaded resource with the network address of the provisioning server 60 from which it was downloaded (Block 212).

Figure 4:
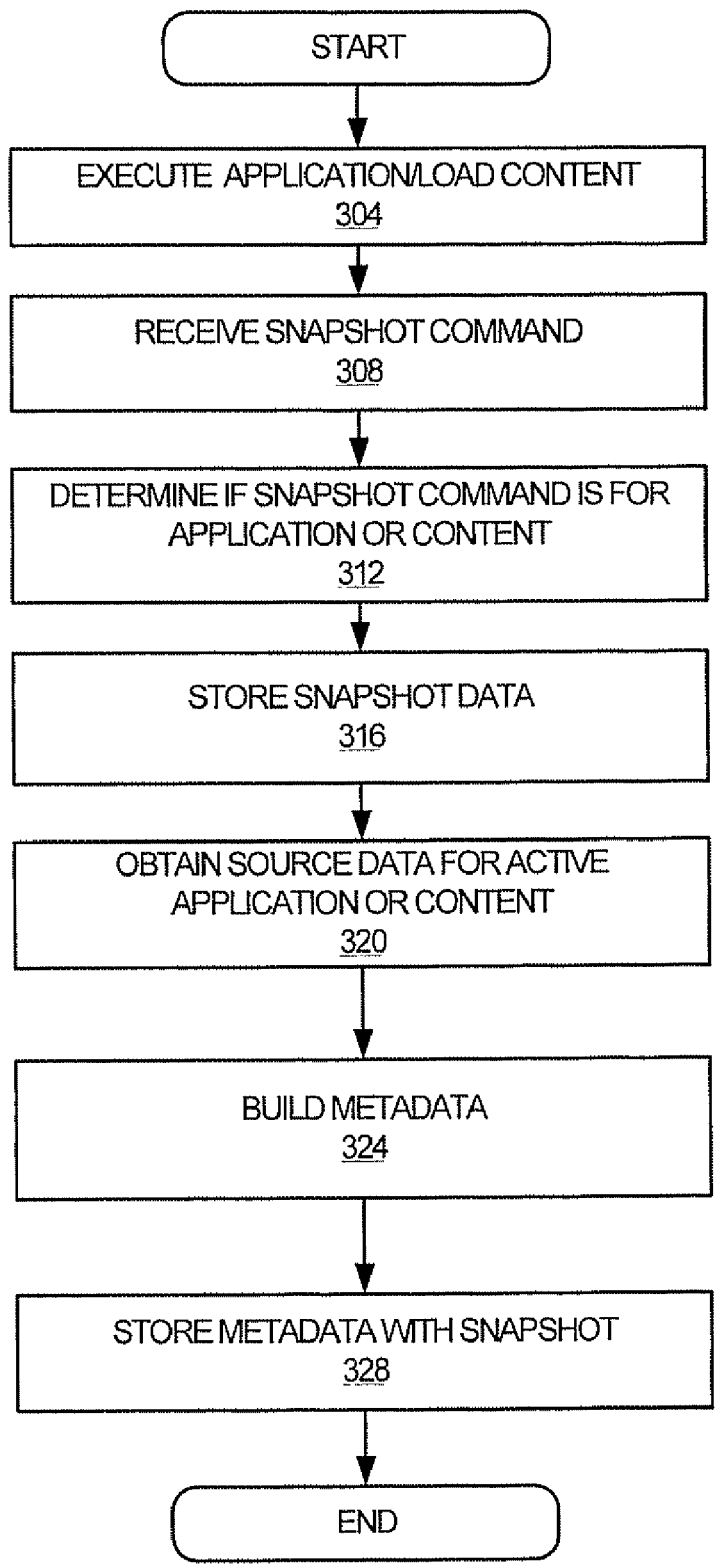

FIG. 4 illustrates further operations according embodiments of the invention. As illustrated therein, a resource is executed (e.g., a downloaded application program is executed and/or a downloaded item of content (e.g. a multimedia file) is played/displayed) (Block 304). As will be understood, an application program is executed by loading the application program into the memory 34 and then executing the application under control of the operating system 120. An item of content can be loaded by starting an application program such as a media player associated with the type of the content and providing the media player with the item of content to be played/displayed.

The portable electronic device 10 then receives a command from the user of the portable electronic device 10 (i.e., a "snapshot" command) (Block 308). The snapshot command can be entered via the user interface 22 of the portable electronic device 10 using any suitable mechanism, including a keypad, touchscreen, menu command, voice command, etc. The portable electronic device 10 then determines if the user desires to take a snapshot of a downloaded application program or an item of content (Block 312). In some embodiments the portable electronic device 10 may prompt the user to determine if a snapshot of an application program or an item of content is desired. In some embodiments, different commands/keys/menu selections may be used depending on whether the user desires to take a snapshot of an application program or an item of content.

In other embodiments, however, the portable electronic device 10 may automatically determine whether the snapshot should be of an application program or an item of content. For example, the download manager 130 can monitor the execution of application programs and items of content. If an item of content is being displayed/played when the snapshot command is received, then the portable electronic device 10 may determine that a snapshot of the item of content currently being played/displayed is desired. If no downloaded items of content are currently being played/displayed when the snapshot command is received, then the portable electronic device 10 may determine that a snapshot of an active application program is desired.

If it is determined that a snapshot of an executing application program is desired, then a screenshot, or copy of the image that is displayed on the display screen while the application program is running is saved (Block 316). The portable electronic device 10 retrieves the record created by the download manager 130 associating the executing application program with the network address of the server from which the application program was downloaded (Block 320), and builds a metadata field, such as an Exchangeable image file format (Exit) metadata field, including the network address of the server from which the application program was downloaded (Block 324). The metadata field is stored in the snapshot image (Block 328).

Exchangeable image file format (Exif) is a specification for an image file format that is used by a number of digital cameras. The specification uses the existing JPEG, TIFF Rev. 6.0, and RIFF WAVE file formats, with the addition of specific metadata tags. Exif data is embedded within the image file itself. Image display programs can recognize Exif data and display it alongside the images.

If it is determined that a snapshot of an item of content is desired, then the portable electronic device 10 then creates and stores a truncated/reduced version of the item of content as a "snapshot" of the content, For example, where the item of content is a video file, the portable electronic device 10 may create and store a screen shot or snippet of the video file as the snapshot. For an image file, the portable electronic device 10, may create and store a thumbnail picture as the snapshot. For an audio signal, the portable electronic device 10 may generate a shortened audio clip as the snapshot.

In Block 316 the portable electronic device 10 builds a metadata field including the network address of the location from which the application program was downloaded, and stores the metadata field in the snapshot image. In Block 320, the portable electronic device 10 retrieves the record created by the download manager 130 associating the downloaded item of content with the network address from which the item of content was downloaded.

The user of the portable electronic device can then send the snapshot including the metadata identifying the source from which the subject of the snapshot was downloaded to a remote terminal, such as a mobile telephone of a friend. The recipient of the snapshot can then view or play the snapshot, and can easily download the application/item of content identified by the snapshot, if desired, using the address of the server from which the resource was downloaded, and which is stored in metadata in the snapshot. In some embodiments, the snapshot may be sent via email or MMS message. A message from the sender may be included with the snapshot.

Figure 5:
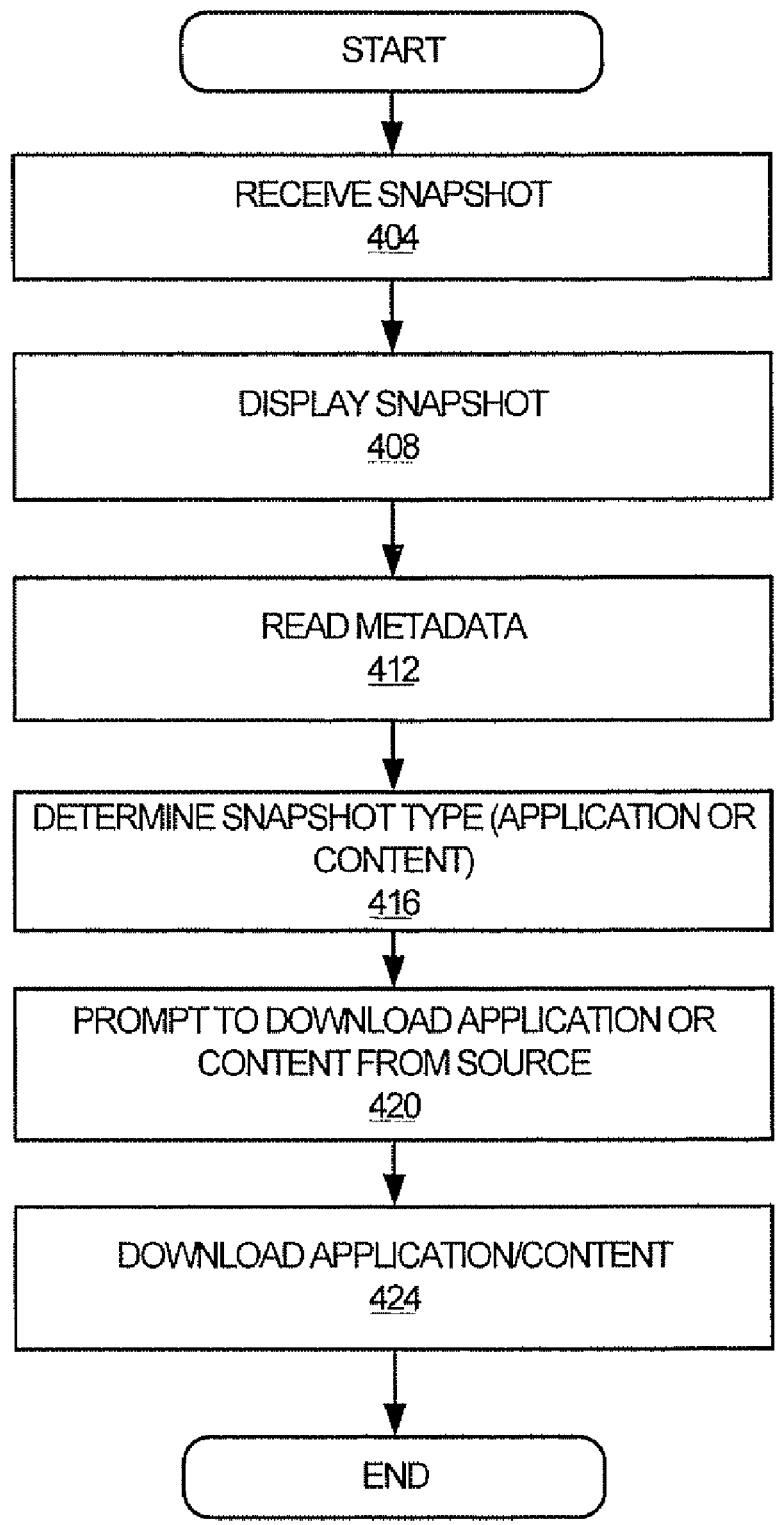

Operations of the recipient portable electronic device are illustrated in FIG. 5. As illustrated therein, a recipient terminal receives the snapshot (Block 404), and plays/displays the content (i.e. the thumbnail, screen shot, still image, sound clip, etc.) stored in the snapshot (Block 408). The recipient terminal also reads the metadata stored in the snapshot and determines the address of the source from which the content or application represented by the snapshot can be downloaded (Block 412). The recipient terminal can then prompt the user to download the content or application (or receive a command from the user to download the content or application) (Block 420). In response to a user command, the recipient terminal can then download the item of content or application program from the provisioning server 60 at the address specified in the metadata of the snapshot (Block 424).

According to embodiments of the invention, downloaded content, such as multimedia content, and application programs, such as games or other applications, can be easily and quickly shared by making the source of such content easily available to other users along with a snapshot that identifies the content or application. Moreover, files other than multimedia files can be quickly and easily shared by using embodiments of the invention, since according to some embodiments snapshots including screen images can be generated and transmitted along with metadata including the address from which the file can be downloaded.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method of operating a portable electronic device including a display screen, a user interface, a controller, a memory and a transceiver, the method comprising:

monitoring external communications of the portable electronic device to determine when the portable electronic device has downloaded a resource, wherein the resource is an executable application program or an item of content;

creating a database record that associates a network address of a remote server from which the resource was downloaded with the resource;

executing the resource on the controller;

receiving a snapshot command through the user interface; and in response to the snapshot command:

determining if the resource executing on the controller is an application program or item of content;

capturing a snapshot image of the resource;

obtaining the network address of the remote server from which the resource was downloaded from the database record for the resource;

building a metadata field containing the network address of the remote server from which the resource was downloaded; and storing the metadata field in the snapshot image.

2. The method of claim 1, wherein obtaining the network address comprises determining a uniform resource indicator (URI) associated with the remote server.

3. The method of claim 2, wherein obtaining the network address comprises retrieving a URI from a table of URI entries associated with resources stored in the portable electronic device and/or retrieving the URI from the resource.

4. The method of claim 1, wherein the metadata field is an Exif metadata field.

5. The method of claim 1, further comprising:

receiving a forward command through the user interface; and in response to the forward command, transmitting the snapshot image to a remote terminal using the transceiver.

6. The method of claim 1, further comprising:
generating a database including the created database records for all resources stored on the electronic device.

7. The method of claim 1, wherein the snapshot image for an application program comprises a screenshot image of content generated by the application program and displayed within the user interface, and wherein the snapshot image for an item of content comprises a thumbnail image of the item of content.

8. The method of claim 7, wherein the screenshot image of content generated by the application program comprises a still image and/or a video image.

9. A portable electronic device, comprising:
a display screen configured to display still and/or video images;
a user interface configured to receive a user input;
a transceiver configured to establish a wireless communications link with a remote server and to download a resource that includes an executable application and an item of content from the remote server; and
a controller configured to monitor external communications of the portable electronic device to determine when the resource is downloaded to the portable external communications device, to execute the resource, to receive a snapshot command through the user interface during execution of the resource, and in response to the snapshot command, to determine if the resource executing on the controller is the executable application or the item of content, to capture a snapshot image of the resource, to determine a network address of the remote server from which the resource was downloaded from a database record that associates the network address of the remote server from which the resource was downloaded with the resource, to build a metadata field that contains the network address of the remote server from which the resource was loaded and to store, in a memory of the portable electronic device, the metadata field in the snapshot image.

10. The portable electronic device of claim 9, the controller is configured to determine the network address by retrieving a uniform resource indicator (URI) from a table of URI entries associated with resources stored in the portable electronic device.

11. The portable electronic device of claim 9, wherein the snapshot image of the resource comprises an image displayed on the display screen, and the controller is configured to generate metadata including the network address and to include the metadata in the snapshot image.

12. The portable electronic device of claim 9, wherein the controller is further configured to receive a forward command through the user interface, and in response to the forward command, to transmit the snapshot image to a remote terminal using the transceiver.

13. The portable electronic device of claim 9, wherein the controller is further configured to store the network address of the remote server in a database, and to associate the network address with the resource in the database.

* * * * *

UNITED STATES PATENT AND TRADEMARK OFFICE
CERTIFICATE OF CORRECTION

PATENT NO. : 8,099,455 B2  Page 1 of 1
APPLICATION NO. : 11/839878
DATED : January 17, 2012
INVENTOR(S) : Aronsson et al.

It is certified that error appears in the above-identified patent and that said Letters Patent is hereby corrected as shown below:

In the Patent:

Column 5, Line 13: Please correct "include the following hard"
 to read -- include the following: hard --

Column 9, Line 61: Please correct "was obtained," to read -- was obtained. --

Column 11, Line 13: Please correct "(Exit) metadata" to read -- (Exif) metadata --

Signed and Sealed this
First Day of May, 2012

David J. Kappos
*Director of the United States Patent and Trademark Office*